United States Patent
Yerke et al.

(10) Patent No.: US 8,694,205 B1
(45) Date of Patent: Apr. 8, 2014

(54) MULTI-ZONE DEMIST STRATEGY

(71) Applicant: Ford Global Technologies, LLC, Dearborn, MI (US)

(72) Inventors: Eric R. Yerke, Redford, MI (US); James R. Hurd, Canton, MI (US); Paul Bryan Hoke, Plymouth, MI (US); Frank Fusco, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/747,662

(22) Filed: Jan. 23, 2013

(51) Int. Cl.
*G06F 7/00* (2006.01)

(52) U.S. Cl.
USPC .................................................. 701/36

(58) Field of Classification Search
USPC .................................................. 701/36
See application file for complete search history.

(56) References Cited

U.S. PATENT DOCUMENTS

| | | | |
|---|---|---|---|
| 5,518,176 A | 5/1996 | Turner | |
| 5,860,593 A | 1/1999 | Heinle | |
| 5,957,375 A | 9/1999 | West | |
| 6,192,698 B1 | 2/2001 | Kakehashi | |
| 6,868,900 B2 | 3/2005 | Dage | |
| 7,653,215 B2* | 1/2010 | Stam | 382/104 |
| 7,931,209 B2 | 4/2011 | Mola | |
| 2002/0121972 A1* | 9/2002 | Schofield et al. | 340/438 |
| 2006/0177098 A1* | 8/2006 | Stam | 382/104 |
| 2009/0145141 A1* | 6/2009 | Akahoshi et al. | 62/133 |
| 2011/0160958 A1 | 6/2011 | Shiroyama et al. | |
| 2012/0009859 A1* | 1/2012 | Wijaya et al. | 454/75 |
| 2012/0011869 A1* | 1/2012 | Kondo et al. | 62/176.5 |

\* cited by examiner

*Primary Examiner* — Hussein A. Elchanti
(74) *Attorney, Agent, or Firm* — Vichit Chea; Ford Global Technologies, LLC (57) ABSTRACT

A system may control demist flow by computing a fogging possibility for a zone of a vehicle using a fogging heuristic according to received inputs, the fogging possibility indicative of fogging risk for vehicle glass in the zone of the vehicle; determining, based on comparing the fogging possibility to at least one fogging risk threshold, whether a change in demist flow for the zone is warranted to at least one of reduce the fogging risk for vehicle glass in the zone of the vehicle and reduce energy usage for the production of demist flow to be provided to vehicle glass in the zone of the vehicle; and selectively providing an output to at least one of the plurality of demist doors associated with the zone of the vehicle to adjust the demist flow to the zone of the vehicle when a change in demist flow for the zone is warranted.

20 Claims, 5 Drawing Sheets

MULTI-ZONE DEMIST STRATEGY

BACKGROUND

Fogging, icing and misting may be experienced on vehicle glass under certain environmental conditions. For example, formation of ice on the exterior surface of vehicle glass may occur when ambient temperature is below freezing. Or, condensation may form on the inside surface of the glass when there is high relative humidity inside the vehicle and where the glass is cool due to a lower temperature outside the vehicle. Condensation may also form on the outside of the glass if cold air is blown onto the inside of the glass in an attempt to remediate a misting condition.

A vehicle may include a heating, ventilation and air-conditioning (HVAC) system to allow a user to set a desired air temperature within the passenger cabin of the vehicle. For example, the HVAC system may provide controls that allow a driver to select a temperature or heat setting through a climate control head unit. A controller of the HVAC system may then operate the HVAC system to achieve the desired temperature or setting. The controller may further facilitate the user configuration of additional settings, such as fan speed, air conditioning (A/C) compressor operation, recirculation and defrost. Based on the received settings, the HVAC system may control a blower and the positioning of various air doors to control movement of recirculated and fresh air through one or more of an evaporator core and a heater core.

An electronic automatic temperature control (EATC) module may be included in an HVAC system to adjust the level of heating and cooling in the vehicle based on status signals received from sensors and controllers located throughout the vehicle. Accordingly, certain EATC modules may direct the HVAC system to address fogging, icing and misting conditions on the vehicle glass. However, existing EATC modules and manual user inputs may have issues with the efficiency or effectiveness in keeping the windshield and other vehicle glass sufficiently clear.

SUMMARY OF THE INVENTION

An exemplary system and method may control demist flow by computing a fogging possibility for a zone of a vehicle using a fogging heuristic according to received inputs, the fogging possibility indicative of fogging risk for vehicle glass in the zone of the vehicle; determining, based on comparing the fogging possibility to at least one fogging risk threshold, whether a change in demist flow for the zone is warranted to at least one of reduce the fogging risk for vehicle glass in the zone of the vehicle and reduce energy usage for the production of demist flow to be provided to vehicle glass in the zone of the vehicle; and selectively providing an output to at least one of the plurality of demist doors associated with the zone of the vehicle to adjust the demist flow to the zone of the vehicle when a change in demist flow for the zone is warranted

DETAILED DESCRIPTION

Under certain environmental situations, glass fogging, icing and misting can be experienced more on one side of a vehicle than on another. For example, such an uneven situation may occur due to differences in air humidity or temperature of the glass on different sides of the vehicle. These differences may be due to various conditions, such as uneven sun-load falling on different sides of the vehicle, increases in cabin humidity due to occupant respiration, and increases in cabin temperature due to occupant body heat.

An improved HVAC control strategy may be implemented to automatically address these and other environmental situations. Based on environmental and user inputs, an EATC module or other controller of the HVAC system may implement an HVAC control strategy utilizing a fogging heuristic to determine a fogging possibility for a zone of the vehicle. This fogging possibility may be indicative of a fogging risk for the vehicle glass in the associated vehicle zone. If the fogging risk in the zone is determined to exceed a threshold value, the HVAC control strategy may be configured to increase the demist flow to the respective zone. If the fogging risk is determined to be below a threshold value, the HVAC control strategy may be configured to decrease the demist flow to the respective zone. As an example, demist flow may be biased toward a driver side zone of a windshield over a passenger side zone of the windshield or side glass, if fogging risk is determined to be higher on the driver side than on the passenger side. By accounting for fogging probability, the improved HVAC control strategy allows for the use of increased demist flow when fogging risk suggests it, and for decreased demist flow to save energy when fogging risk is determined to be relatively low. Accordingly, the HVAC control strategy may be determine a biased demist flow for the vehicle glass, while at the same time serving to minimize energy utilization of the HVAC system.

In some examples, redirection of the demist/defrost airflow from a side or zone that has less of an issue to a side or zone that has a relatively higher probability of a clouding, icing or misting issue may be performed through use of a multi-function duct. The multi-function duct may provide door actuation in various vehicle zones, thereby allowing doors providing demist flow to certain zones to be closed off, or throttled, and doors providing demist flow to other zones to be opened further to deliver more airflow where it is needed. In other examples, redirection of the demist/defrost airflow from a side or zone that has less of an issue to a side or zone that has a relatively higher probability of a clouding, icing or misting issue may be performed utilizing other manner of ducting, such as through use of dedicated demist ducts or increased flow. The HVAC control strategy may be further configured to adjust a blower speed to compensate for the opening and closing of doors providing demist flow. For example, if a demist flow is increased to a zone by the opening of a door of a multi-function duct, the blower speed may be increased to compensate for the redirected airflow.

Exemplary inputs received by the HVAC control strategy to inform the fogging heuristic may include: vehicle sun-load, vehicle sun-load direction, vehicle occupancy (e.g., by way of seat or seatbelt sensors), cabin percent relative humidity, remote percent relative humidity, remote temperature, cabin temperature, ambient temperature, infrared glass temperature measurement, weather forecast for the current vehicle location, and current demist settings, as some examples. In some cases, the inputs to the HVAC controls strategy may include the use of sensors that are already incorporated into the vehicle, such as existing humidity, sun-load/direction, cabin temperature, and ambient temperature sensors, among other available sources of information.

Exemplary vehicle zones may include various subsets of the passenger cabin or glass of the vehicle. For example, the vehicle glass may be divided into zones according to pane or availability of ducting or demist outlets. Merely by way of example, the zones may include driver-side windshield, passenger-side windshield, left side windows, right side windows, and rear windows. For instance, on vehicles having rear auxiliary HVAC systems, some flow to a headliner or other registers may be initiated, or total flow increased or biased to the rear of the vehicle, if fogging risk in the rear of the vehicle is identified. In some cases, the HVAC control strategy may further include a manual override function be configured to take a requested user action despite the zone settings determined according to the fogging heuristic.

Figure 1:
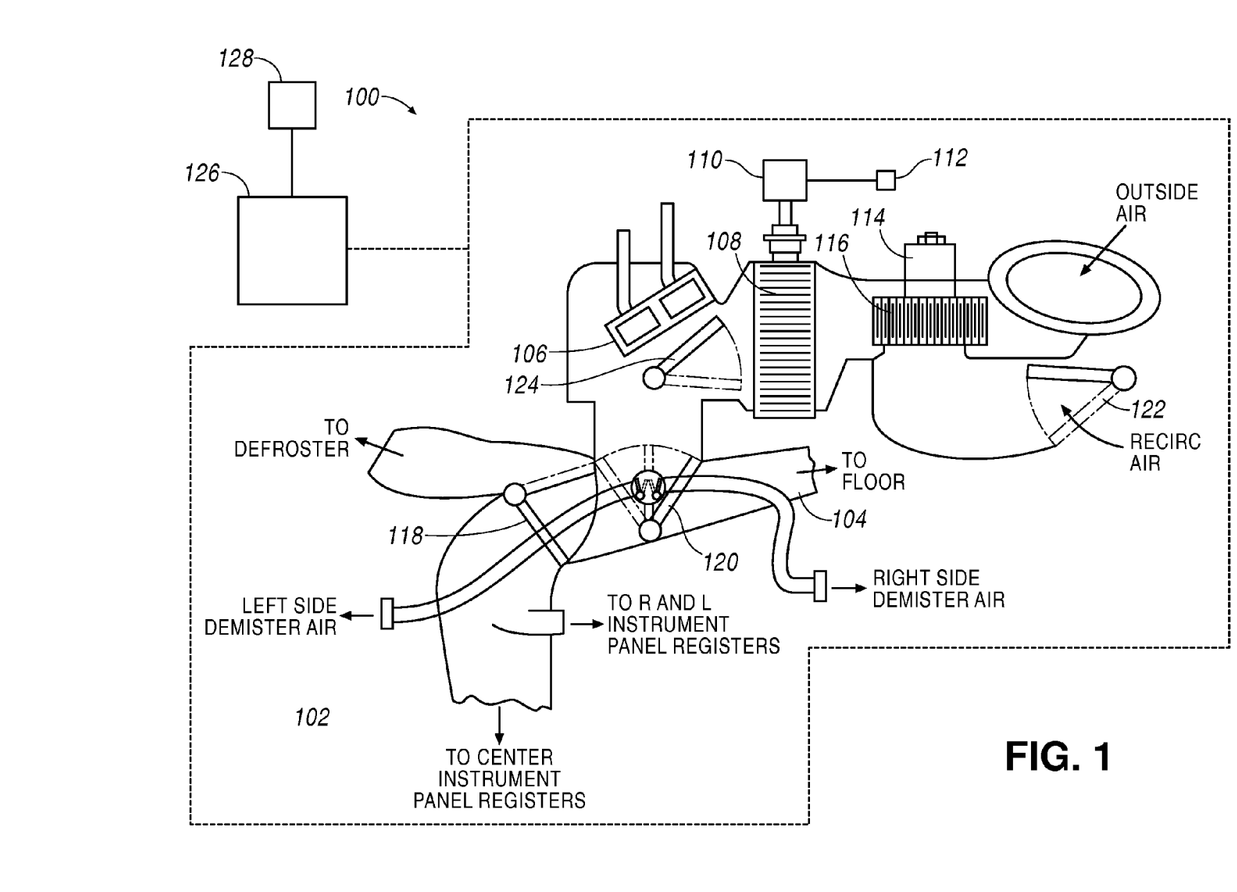
FIG. 1 illustrates an exemplary schematic view of a multi-zone vehicle climate control system for environmental management of a vehicle.

FIG. 1 illustrates an exemplary schematic view of a multi-zone vehicle climate control system 100 for environmental management of a vehicle. The multi-zone vehicle climate control system 100 may include air processing components configured to heat, cool, and otherwise process air according to a HVAC control strategy, as well as distribution components configured to distribute or otherwise direct the processed airflow to one or more zones of the passenger cabin 102 of the vehicle by way of associated ducting 104.

The air processing components may include air heating components, such as a heater core 108. The air processing components may also include air conditioning (A/C) components, such as an evaporator core 110 and a compressor 112. In some instances, the compressor 112 may be electrically driven, while in other instances the compressor 112 may be mechanically driven by a vehicle engine. The A/C components of the system 100 may also include a low-pressure cycle switch 114 in communication with the compressor 112 operable to deactivate the compressor 112 under certain conditions, such as when the temperature of the evaporator core 110 drops below a predetermined value. This deactivation of the compressor 112 may be performed to aid in the prevention of freezing of the evaporator core 110 in cold conditions. The system 100 may also include fan components including, for example, a HVAC blower 116 and blower wheel 118 for generating airflow of the air being processed.

To control the distribution of the airflow through the ducting 104, the air distribution components may include an arrangement of airflow doors including, for example, a panel-defrost door 120 facilitating the selective direction of airflow to the panel/defrost vents, a floor-panel door 122 facilitating the selective direction of airflow to the floor vents, and an outside recirculated air door 124 facilitating the selection of passenger cabin 106 or outside air as input to the HVAC system. A temperature control blend door 126 may also be included to provide for hot air mixing to obtain a desired target discharge air temperature to be exited from the system 100 into the passenger cabin 106. To facilitate the selective distribution of air, one or more of the doors 120, 122, 124 and 126 may be positioned as open, partially open, or closed. In some cases, one or more of the doors 120, 122, 124 and 126 may be driven by vacuum motors that provide for positioning of the doors according to amount of vacuum, e.g., by using vacuum, partial vacuum and no vacuum positions. In some cases, one or more of the doors 120, 122, 124 and 126 may be driven by way of an electric servo motor to facilitate the selective positioning of the doors.

Figure 2A:
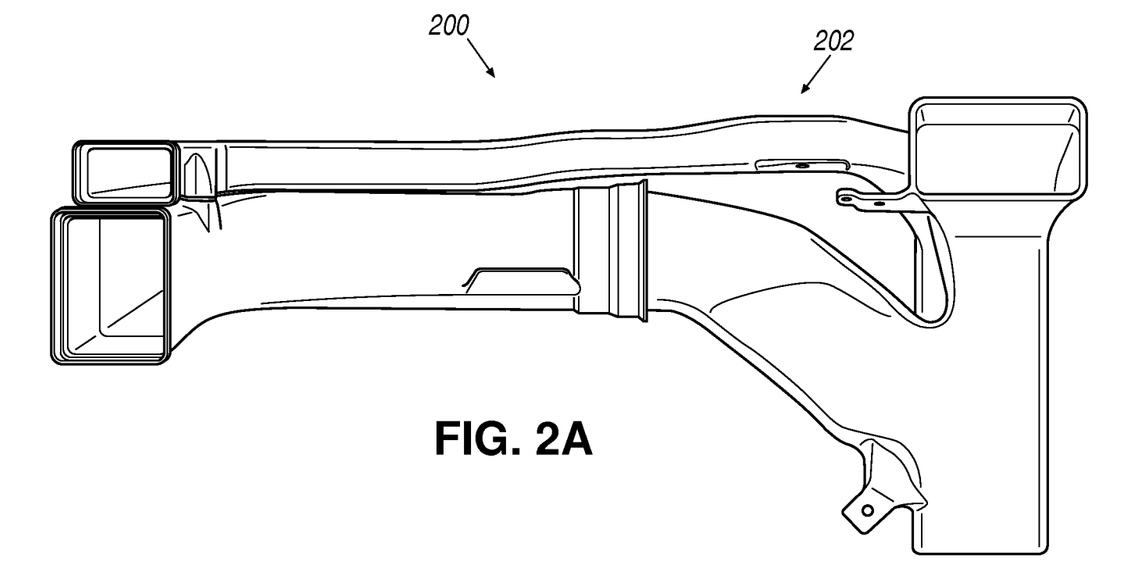
FIGS. 2A and 2B illustrate exemplary HVAC duct configurations for use in a multi-zone vehicle climate control system.

FIG. 2A illustrates an exemplary duct configuration for use in a multi-zone vehicle climate control system. The exemplary HVAC duct 200 may be used to allow for the selective provisioning of different amounts of demist airflow to zones of the passenger cabin 106. For example, in the exemplary HVAC duct 200, a demist door may be used to selectively allow airflow into a dedicated demist duct 202 flowing directly from the HVAC plenum, where the amount of air to provide into the dedicated demist duct 202 may be determined according to an amount of demist flow required for the associated zone.

Figure 2B:
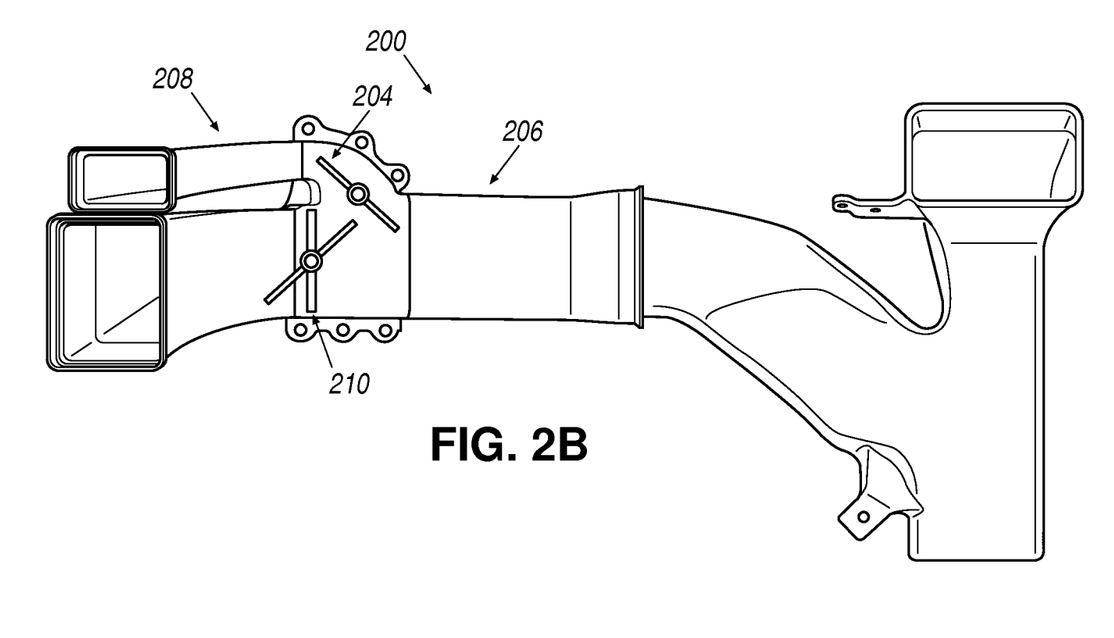

As another example, as shown in FIG. 2B, a demist door 204 may be one function of a portion of a multiple-function HVAC duct 200, and may be used to select an amount of airflow from the multiple-function HVAC duct 200 to be directed to an associated vehicle zone via demist duct 208, while door 210 may be used to provide another amount of the airflow for other purposes. As yet a further example, while not illustrated individual demist doors may be located within the HVAC plenum to control airflow to various other demist outlets. Accordingly, various exemplary HVAC ducts 200 may accomplish aspects of the HVAC control strategy by including doors associated with demist outlets located in different zones of the passenger cabin 102.

Returning to FIG. 1, the system 100 may further include an EATC module such as controller 128 configured to control the operation of the system 100. The controller 128 may be configured to receive inputs from a vehicle occupant via the climate control head 130 to facilitate the occupants of the vehicle in selecting environmental conditions in the vehicle. The climate control head 130 may be included as part of a vehicle instrument panel, and may be configured to allow a vehicle occupant to manually control the HVAC functions, and in some cases, override an automatic operation of the system 100. As some examples, the climate control head 130 may include controls such as: a mode selector configured to allow an occupant to choose where airflow will be directed by the panel-defrost door 120 and floor-panel door 122, a temperature selector configured to allow an occupant to select a preferred cabin air temperature, an A/C control to allow an occupant to manually select or deselect use of the compressor 112, a recirculation selector to allow for control of the recirculated air door 124 to select recirculation of cabin air, fresh air, or some combination thereof, and a fan selector configured to allow an occupant to choose fan speed settings for the HVAC blower 116 and blower wheel 118.

Figure 3:
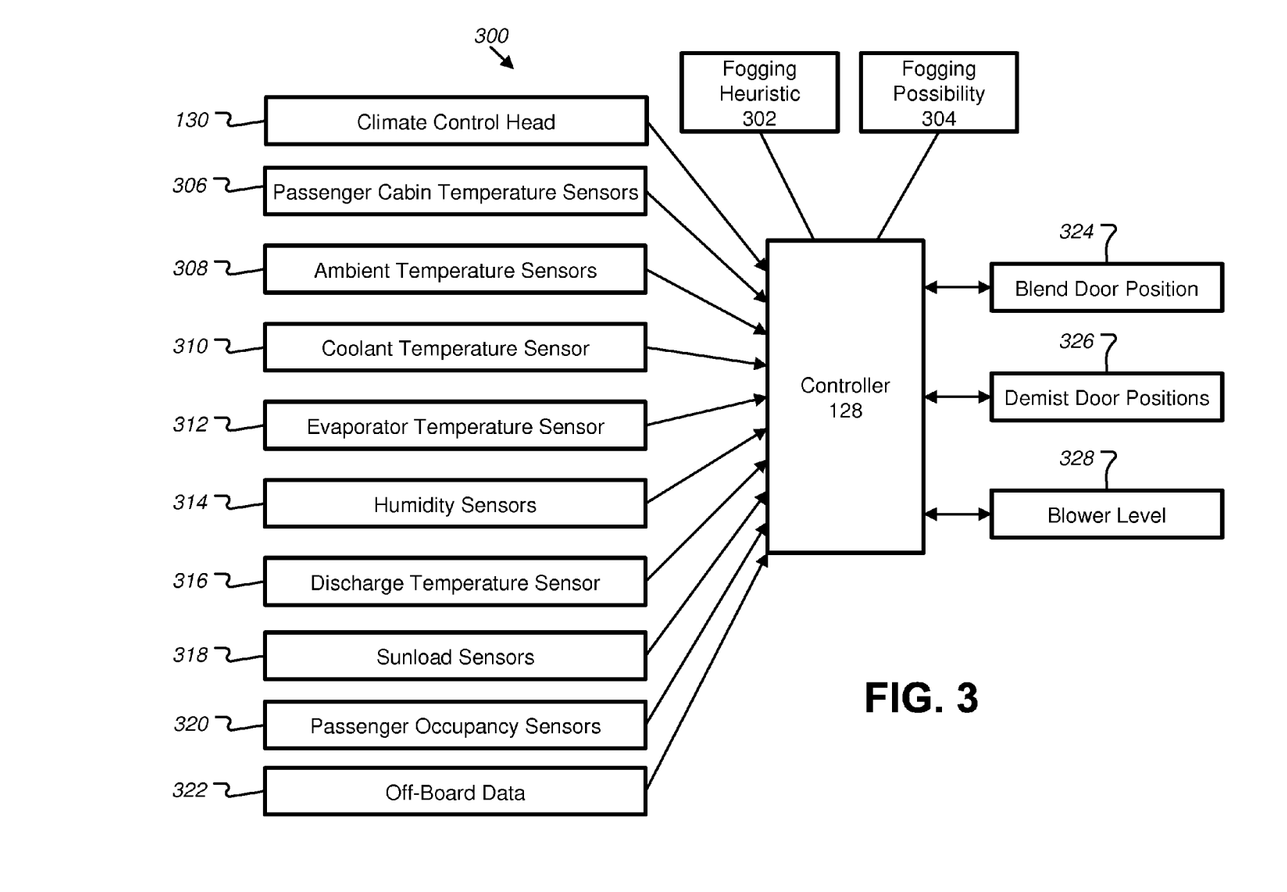
FIG. 3 illustrates an exemplary block diagram of a control system of a multi-zone vehicle climate control system for implementing a multi-zone demist HVAC strategy accounting for fogging risk.

FIG. 3 illustrates an exemplary block diagram of a control system 300 of a multi-zone vehicle climate control system 100 for implementing a multi-zone demist HVAC strategy accounting for fogging risk. The exemplary control system 300 may utilize the controller 128 to receive inputs from a vehicle occupant via climate control head 130, and to generate commands to control aspects of the multi-zone vehicle climate control system 100, such as air heating components, air conditioning components, fan components, doors and other air distribution components. As mentioned above, the controller 128 may be configured to receive inputs. Based on those inputs, as well as from a variety of inputs received from various sensors of the vehicle, the controller 128 may be further configured to utilize a fogging heuristic 302 to determine a fogging possibility 304. Based on the fogging possibility 304, the controller 128 may be further configured to algorithmically control climate control functions based on the fogging possibility 304 to optimize demist flow to zones of the passenger cabin 102. For example, the controller 128 may be configured to provide an output 324 to control positioning of the temperature control blend door 126, an output 326 to control positioning of one or more demist doors, and an output 328 to control a fan components such as the HVAC blower 116.

With respect to the sensors, the controller 128 may be configured to receive inputs from: one or more passenger cabin temperature sensors 306 configured to provide information representative of interior cabin temperature, ambient temperature sensors 308 configured to provide information representative of ambient (outside) air temperature, an engine coolant temperature sensor 310 configured to provide information representative of the engine coolant temperature for use in determining available heat (or for a vehicle having a heat pump heating system, another type of sensor such a cabin condenser temperature sensor), an evaporator temperature sensor 312 configured to provide information representative of the temperature of the evaporator core 110, humidity sensors 314 configured to provide information representative of the relative humidity of the passenger cabin, discharge air temperature sensors 316 configured to provide information representative of the discharge air temperature into the passenger cabin 102, sun-load sensors 318 configured to utilize photodiodes or other elements to provide information related to sun-loading and direction as it related to various zones of the vehicle, and passenger occupancy sensors 320 configured to provide information related to which seats of the vehicle are occupied.

Sensors may be located in various zones of the vehicle to facilitate the computation of fogging possibilities 304 for different vehicle zones. As some examples, the controller 128 may be configured to receive inputs from multiple cabin temperature sensors 306 and humidity sensors 314 located in different zones of the passenger cabin 102 or from other on-board sources such as vehicle rain sensors, and whether or at what speed wiper operation is engaged. Moreover, the controller 128 may receive inputs from off-board data sources 322 to further inform the fogging heuristic 302, such as weather reports for an area local to the vehicle determined according to vehicle navigation information or data received from a phone or other mobile device, as some examples.

The controller 128 may be programmed with an HVAC control strategy utilizing the fogging heuristic 302 to determine a fogging possibility 304 indicative of a fogging risk for the vehicle glass in a zone of the vehicle. Based on the user inputs, sensor inputs, and current demist flow settings, the controller 128 may compute a fogging possibility 304 for a zone of the vehicle indicative of a likelihood of fogging risks for vehicle glass in the respective zone of the vehicle.

If the fogging risk in the zone is determined to exceed a threshold value, then the HVAC control strategy may be configured to increase the demist flow to the respective zone. If the fogging risk in the zone is determined to be below a threshold value, then the HVAC control strategy may be configured to decrease the demist flow to the respective zone. These thresholds may be the same in certain examples. In other examples, the thresholds for increasing and decreasing demist flow may differ to provide for a level of hysteresis to reduce oscillation between demist flow levels.

The HVAC control strategy may further determine fogging risks for the different zones of the vehicle to adjust the demist flow in the different zones. Rather than independently computing a fogging possibility 304 for a first zone, and a second fogging possibility 304 for a second zone, in some examples the controller 128 may compute fogging possibilities 304 for multiple zones in relation to one another. For instance, the controller 128 may determine fogging possibilities 304 for driver and passenger zones of a windshield in relation to one another. To do so, the controller 128 may consider one or more of sensor input indicative of passenger occupancy of the passenger seat, sensor input indicative of sun-load of the driver side as compared to the sun-load of the passenger side, and current demist settings, such as an output to adjust a left demist door, an output to adjust a right demist door, and an output to adjust a defrost nozzle. By considering multiple zones in relation to one another, the controller 128 may compute fogging possibilities 304 based on fogging risks of a zone in consideration of fogging risks of adjacent zones.

Accordingly, the HVAC control strategy may be configured to provide outputs 324, 326 and 328 to adjust the demist flow to the various zones to effect the improved automatic handling of fogging, icing and misting conditions on the vehicle glass. In some cases, these increases and decreases in demist flow may be applied to the vehicle glass using dedicated demist ducts or multi-function HVAC ducts such as those discussed above with respect to FIGS. 2A and 2B.

Figure 4:
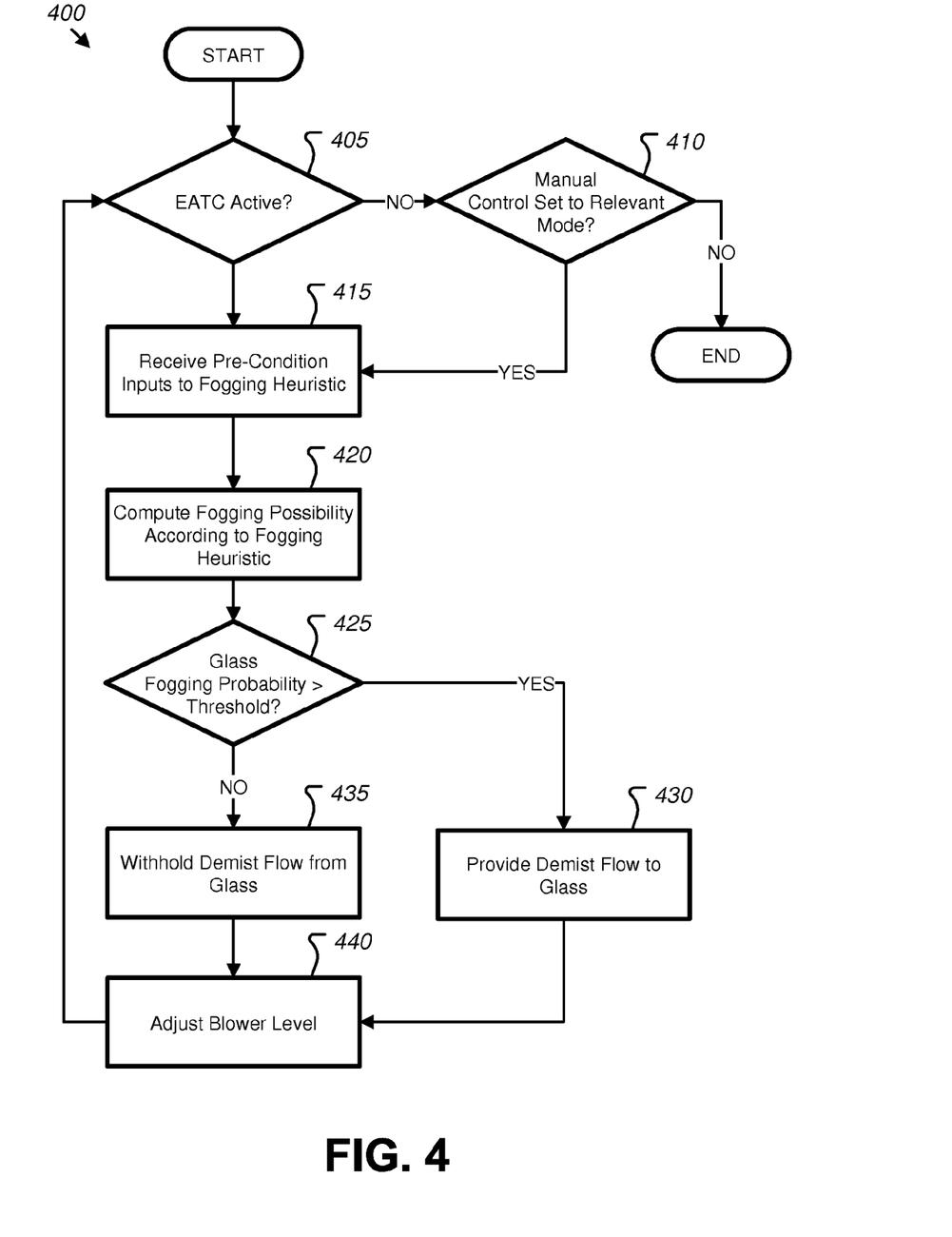
FIG. 4 illustrates an exemplary process for implementing a multi-zone demist HVAC strategy in a multi-zone vehicle climate control system accounting for fogging risk.

FIG. 4 illustrates an exemplary process 400 for implementing a multi-zone demist HVAC strategy in a multi-zone vehicle climate control system 100 accounting for fogging risk. The process 400 may be performed by various devices, such as by a controller 128 utilizing the fogging heuristic 302 in combination with the components of the HVAC system 100 and a multiple-function HVAC duct 200. By utilizing the fogging heuristic 302, the HVAC control strategy may improve the handling of fogging, icing and misting conditions on the vehicle glass, while at the same time serving to minimize energy utilization of the HVAC system.

In block 405, the controller 128 determines whether electronic automatic temperature control is active. For example, the controller 128 may determine that electronic automatic temperature control is active according to inputs received from a climate control head 130 of the HVAC system. If electronic automatic temperature control is determined to be active, control passes to block 415. Otherwise, control passes to block 410.

In block 410, the controller 128 determines whether the user has selected for demist flow to be provided to certain vents or demist outlets. For example, even if electronic automatic temperature control is inactive, certain manual air flow settings may benefit from utilization of the fogging heuristic 302. The controller 128 may receive inputs from the climate control head 130 to determine whether flow has been selected to be provided to vents or demist outlets that involve the fogging heuristic 302. If the manual air flow settings may benefit from utilization of the fogging heuristic 302, control passes to block 415. Otherwise the process 400 ends.

In block 415, the controller 128 receives pre-condition inputs to inform the fogging heuristic 302. For example, the controller 128 may receive inputs from a vehicle occupant via climate control head 130, as well as other inputs from various sensors of the vehicle. Exemplary sensor inputs to the controller 128 may include one or more of sensor inputs discussed in detail above. Because current settings may affect fogging possibility 304, the controller 128 may further utilize current demist flow settings for the zone or for other zones in the vehicle as an input to the fogging heuristic 302.

In block 420, the controller 128 computes or otherwise calculates a fogging possibility 304. Based on the user inputs, sensor inputs, and current demist flow settings, the controller 128 may compute a fogging possibility 304 for a zone of the vehicle indicative of a likelihood of fogging risk for vehicle glass in the respective zone of the vehicle. The controller 128 may further compute a fogging possibility 304 for additional zones of a vehicle. For instance, the controller 128 may compute a fogging possibility 304 for a first zone of the vehicle and also a second fogging possibility 304 for a second zone of the vehicle. The first zone and the second zone may be, for example, left and right sides of a vehicle.

In block 425, the controller 128 compares the determined fogging possibility 304 to a fogging risk threshold. The fogging risk threshold may be used to determine how much demist flow to selectively provide to the vehicle zone. For example, if the determined fogging possibility 304 exceeds or otherwise triggers the fogging risk threshold, the controller 128 may determine to provide or continue to provide demist flow to the zone. Or, if the determined fogging possibility 304 fails to exceed or trigger the fogging risk threshold, the controller 128 may determine to discontinue or continue to not provide demist flow to the zone. If the controller 128 computes a fogging possibility 304 multiple zones of the vehicle, then each fogging possibility 304 may be compared to a fogging risk threshold. These fogging risk thresholds may differ based on the different zones of the vehicle. For example, higher priority zones of the vehicle may utilize lower thresholds for the provisioning of additional demist flow. If flow is to be maintained to the vehicle zone, control passes to block 430. Otherwise, control passes to block 435.

In block 430, the controller 128 maintains demist flow to the vehicle zone. For example, a demist door 204 may be one function of a multiple-function HVAC duct 200, and may be used to select an amount of airflow from the multiple-function HVAC duct 200 to be directed to an associated vehicle zone via demist duct 208. To maintain demist flow to the vehicle zone, the controller 128 may provide an output to open the demist door 204 to selectively providing airflow to at least one demist outlet in the zone of the vehicle.

In block 435, the controller 128 does not maintain demist flow to the vehicle zone. Continuing with the exemplary multiple-function HVAC duct 200, to stop maintaining demist flow to the vehicle zone, the controller 128 may provide an output to close the demist door 204 to selectively close off airflow to the at least one demist outlet in the zone of the vehicle.

In block 440, the controller 128 provides an output to the HVAC blower 116 to compensate for any changes to outlets open and fogging probability. Still continuing with the exemplary multiple-function HVAC duct 200, if the controller 128 increased the opening of the demist door 204, then the controller 128 may command the HVAC blower 116 to provide additional output to account for the airflow being diverted from the multiple-function HVAC duct 200 for use in providing demist flow to the vehicle zone, thereby preserving the amount of airflow utilized for other purposes. Or, if the controller 128 reduced the opening of the demist door 204, the controller 128 may command the HVAC blower 116 to provide reduced output to account for the airflow no longer being diverted from the multiple-function HVAC duct 200, thereby preventing an increase in the amount of airflow utilized for other purposes.

After block 440 the process 400 returns to block 405. While the process 400 is described with respect to a multiple-function HVAC duct 200, other types of ducting 104 are similarly applicable. For example, dedicated demist ducts 202 flowing directly from the HVAC plenum, individual demist doors located within the HVAC plenum to control airflow to various other demist outlets, and doors associated with demist outlets located in different zones of the passenger cabin 102 may also be utilized to selectively provide demist flow to the vehicle zone.

Computing devices such as the controller 128 generally include computer-executable instructions executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. An application configured to perform the operations of the controller 128, such as the fogging heuristic 302, may be one such computer program product and may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    determining, by a device based on comparing a fogging possibility indicative of a fogging risk in a vehicle zone to a fogging risk threshold, a change in demist flow for the zone to at least one of reduce the fogging risk and reduce energy usage;
    comparing the fogging possibility to at least one fogging risk threshold; and
    selectively providing output to adjust the demist flow to the zone of the vehicle when a change in demist flow for the zone is warranted, wherein at least one output includes at least one of increasing the demist flow for the zone when the fogging possibility triggers a fogging risk threshold, and decreasing the demist flow for the zone when the fogging possibility triggers a fogging risk threshold.

2. The method of claim 1, wherein the output includes a door position for a demist door selectively providing airflow to at least one demist outlet in the zone of the vehicle, and a blower setting to compensate for any adjustments to the door position.

3. The method of claim 2, wherein the demist door controls at least one of an airflow from a multiple-function airflow duct, airflow to a dedicated demist duct, and airflow within an airflow plenum to control airflow volume.

4. The method of claim 1, further comprising:
    computing a second fogging possibility for a second zone of a vehicle using the fogging heuristic, the second fogging possibility indicative of a second fogging risk for vehicle glass in the second zone of the vehicle;
    determining, based on comparing the second fogging possibility to the at least one fogging risk threshold, whether a change in demist flow for the second zone is warranted to at least one of reduce the second fogging risk for vehicle glass in the second zone of the vehicle and reduce energy usage for the production of demist flow to be provided to vehicle glass in the second zone of the vehicle; and
    selectively providing at least one output to adjust the demist flow to the second zone of the vehicle when a change in demist flow for the second zone is warranted.

5. The method of claim 1, further comprising computing the fogging possibility for the vehicle zone using a fogging heuristic according to received inputs from at least one of a remote sensor, an input from an occupant of the vehicle, a cabin temperature sensor, a cabin relative humidity sensor, a cabin sun-load sensor, a vehicle tracking sensor, a received weather report, a rain sensor, wiper operation, and an ambient temperature sensor.

6. The method of claim 1, wherein the output includes increasing an amount of airflow to the zone of the vehicle when a change in demist flow for the zone is warranted.

7. A climate controller including a non-transitory computer-readable medium tangibly embodying computer-executable instructions configured to perform operations comprising:
    computing a fogging possibility for a zone of a vehicle using a fogging heuristic according to received inputs, the fogging possibility indicative of a fogging risk for vehicle glass in the zone of the vehicle;
    determining, based on comparing the fogging possibility to at least one fogging risk threshold, whether a change in demist flow for the zone is warranted to at least one of reduce the fogging risk for vehicle glass in the zone of the vehicle and reduce energy usage for the production of demist flow to be provided to vehicle glass in the zone of the vehicle;
    comparing the fogging possibility to at least one fogging risk threshold; and
    selectively providing at least one output to adjust the demist flow to the zone of the vehicle when a change in demist flow for the zone is warranted, wherein at least one output includes at least one of increasing the demist flow for the zone when the fogging possibility exceeds the fogging threshold, and decreasing the demist flow for the zone when the fogging possibility does not exceed the fogging risk threshold.

8. The climate controller of claim 7, wherein the at least one output to adjust the demist flow includes a door position for a demist door selectively providing airflow to at least one demist outlet in the zone of the vehicle, and a blower setting to compensate for any adjustments to the door position.

9. The climate controller of claim 8, wherein the demist door controls at least one of airflow from a multiple-function airflow duct, airflow to a dedicated demist duct, and airflow with an airflow plenum to control airflow volume.

10. The climate controller of claim 7, wherein the automatic climate controller is further configured to perform operations comprising:
    computing a second fogging possibility for a second zone of a vehicle using the fogging heuristic, the second fogging possibility indicative of a second fogging risk for vehicle glass in the second zone of the vehicle,
    determining, based on comparing the second fogging possibility to the at least one fogging risk threshold, whether a change in demist flow for the second zone is warranted to at least one of reduce the second fogging risk for vehicle glass in the second zone of the vehicle and reduce energy usage for the production of demist flow to be provided to vehicle glass in the second zone of the vehicle, and
    selectively providing at least one output to adjust the demist flow to the second zone of the vehicle when a change in demist flow for the second zone is warranted.

11. The climate controller of claim 7, wherein adjust the demist flow to the zone of the vehicle and to adjust the demist flow to the second zone of the vehicle includes providing the at least one output to adjust a left demist door, an output to adjust a right demist door, and an output to adjust a defrost nozzle.

12. The climate controller of claim 7, wherein the inputs are received from at least one of a remote sensor, an input from an occupant of the vehicle, a cabin temperature sensor, a cabin relative humidity sensor, a cabin sun-load sensor, a vehicle tracking sensor, a received weather report, a rain sensor, wiper operation, and an ambient temperature sensor.

13. The climate controller of claim 7, wherein at least one output includes at least one of increasing and decreasing an amount of airflow to the zone of the vehicle when a change in demist flow for the zone is warranted.

14. A system, comprising:
a plurality of demist doors, each associated with one of a plurality of zones of a vehicle; and
a climate controller device configured to control demist flow using the plurality of demist doors by performing operations including:
computing a fogging possibility for a zone of a vehicle using a fogging heuristic according to received inputs, the fogging possibility indicative of a fogging risk for vehicle glass in the zone of the vehicle, determining, based on comparing the fogging possibility to at least one fogging risk threshold, whether a change in demist flow for the zone is warranted to at least one of reduce the fogging risk for vehicle glass in the zone of the vehicle and reduce energy usage for the production of demist flow to be provided to vehicle glass in the zone of the vehicle, and
selectively providing at least one output to at least one of the plurality of demist doors associated with the zone of the vehicle to adjust the demist flow to the zone of the vehicle when a change in demist flow for the zone is warranted, wherein the demist flow at least one of increases for the zone when the fogging possibility triggers a fogging risk threshold, and decreases for the zone when the fogging possibility triggers a fogging possibility threshold.

15. The system of claim 14, wherein the climate controller device is further configured to perform operations comprising:
computing a second fogging possibility for a second zone of a vehicle using the fogging heuristic, the second fogging possibility indicative of a second fogging risk for vehicle glass in the second zone of the vehicle,
determining, based on comparing the second fogging possibility to the at least one fogging risk threshold, whether a change in demist flow for the second zone is warranted to at least one of reduce the second fogging risk for vehicle glass in the second zone of the vehicle and reduce energy usage for the production of demist flow to be provided to vehicle glass in the second zone of the vehicle, and
selectively providing at least one output to at least a second one of the plurality of demist doors associated with the second zone of the vehicle to adjust the demist flow to the second zone of the vehicle when a change in demist flow for the second zone is warranted.

16. The system of claim 14, wherein the at least one output includes a door position for a demist door selectively providing airflow to at least one demist outlet in the zone of the vehicle, and a blower setting to compensate for any adjustments to the door position.

17. The system of claim 15, wherein to adjust the demist flow to the zone of the vehicle and to adjust the demist flow to the second zone of the vehicle includes providing an output to adjust a left demist door, an output to adjust a right demist door, and an output to adjust a defrost nozzle.

18. The system of claim 17, wherein the demist door controls at least one of airflow from a multiple-function airflow duct, airflow to a dedicated demist duct, and airflow with an airflow plenum to control airflow volume.

19. The system of claim 14, wherein the received inputs are received from at least one of a remote sensor, an input from an occupant of the vehicle, a cabin temperature sensor, a cabin relative humidity sensor, a cabin sun-load sensor, a vehicle tracking sensor, a received weather report, a rain sensor, wiper operation, and an ambient temperature sensor.

20. The system of claim 14, wherein at least one output includes at least one of increasing and decreasing an amount of airflow to the zone of the vehicle when the change in demist flow for the zone is warranted.

* * * * *